Oct. 11, 1927.

W. W. WALLACE

1,645,363

APPARATUS FOR LOADING BRICK INTO BOX CARS

Filed March 28 1925 7 Sheets-Sheet 3

Oct. 11, 1927.

W. W. WALLACE 1,645,363

APPARATUS FOR LOADING BRICK INTO BOX CARS

Filed March 28 1925   7 Sheets-Sheet 6

Inventor
William W. Wallace
by James R. Hodder
Attorney

Patented Oct. 11, 1927.

1,645,363

UNITED STATES PATENT OFFICE.

WILLIAM W. WALLACE, OF CHICAGO, ILLINOIS, ASSIGNOR TO NEW YORK BRICK HANDLING CORPORATION, OF NEW YORK, N. Y., A CORPORATION OF NEW YORK.

APPARATUS FOR LOADING BRICK INTO BOX CARS.

Application filed March 28, 1925. Serial No. 19,152.

My present invention relates to brick handling apparatus, and more particularly to an improved apparatus for loading brick into box cars or other enclosed spaces.

Heretofore in loading brick into box cars it has been necessary to wheel the brick in small loads, as in wheelbarrows, wheel the same into the car and pile the brick inside the car by hand. Necessarily this is a slow and therefore an expensive procedure, and when the car has reached its destination the process must be reversed. In my present invention I have devised a machine whereby brick in units of any desired size may be moved into and loaded into a box car or other enclosed space mechanically. This is advantageous as, at the present day, it is customary to build brick kilns by mechanical means that takes a unit stack of brick and places the same in a kiln, this same apparatus, or a modification thereof, being utilized to tear down or dismantle the kiln after the burning operation has taken place. In the dismantling operation the unit stack of bricks may be loaded onto my present improved apparatus and therefore mechanically placed directly into a box car.

The principal object of my invention, therefore, is an improved machine for mechanically loading brick into box cars or other enclosed spaces.

Another object of my invention is an improved device for picking up a unit stack of brick and placing the same in position in a box car.

Other objects and novel features of the construction and arrangement of parts comprising my invention will be apparent as the description of the invention progresses.

In the accompanying drawings illustrating my improved invention.

Referring to the drawings, 10 designates a box car or similar enclosed space provided with doors or openings 11 through which may be carried the articles to be loaded therein. At one side of the box car 10 and extending transversely outward therefrom is a bridge defined generally as 12 and consisting of channel members 13 arranged parallel to each other and connected together by angles 14 and cross members or bars 15, the whole constituting a rectangular frame of any desired length. Cross bars 16 are arranged on the upper pair of channel members 13, and secured to said transverse members and extending longitudinally of the bridge 12 are rails 17 spaced apart from each other in the usual manner, and on which rails runs apparatus to be hereinafter described. The lower pair of channel members 13 rest on I-beams 18 which, in turn, rest on wedge members 19. Cooperating with the wedge members 19 are wedge members 20 resting on supports 21 mounted on members 22 that are embedded in the ground or arranged in any suitable manner. The wedge members 19 and 20 cooperate and act as a means for adjusting the one end or the other, or both, of the bridge 12 vertically. Extending longitudinally of the bridge 12, secured to the cross members 16, are parallelly arranged boards 23 and along which an operator can walk. On the rear end of the bridge, or that end furthest removed from the box car 10, are transverse members 24 of greater length than the transverse members 16, and on such transverse members are parallelly arranged boards 25 constituting a platform on which the operator may stand. Secured to that end of the bridge 12 adjacent to the box car 10 and on the top surface thereof are bearings 26 in which is rotatably mounted a shaft 27 having secured thereto, or rotatably mounted thereon, one end of a frame 28, which has secured thereto and in alignment with the rails 17 a pair of rails 29. To the free end of the frame 28 are secured members 30 which rest on the edge of the opening 11 of the box car 10 and hold the frame 28 in position. Numeral 32 designates rails similar in cross sectional area to the rails 29 and 17, and which are adapted to be placed on the floor of the box car 10 transversely thereof, as clearly shown in Fig. 1. The bridge just described is adapted to be positioned adjacent to the device for unloading kilns by mechanical means.

Figure 6:
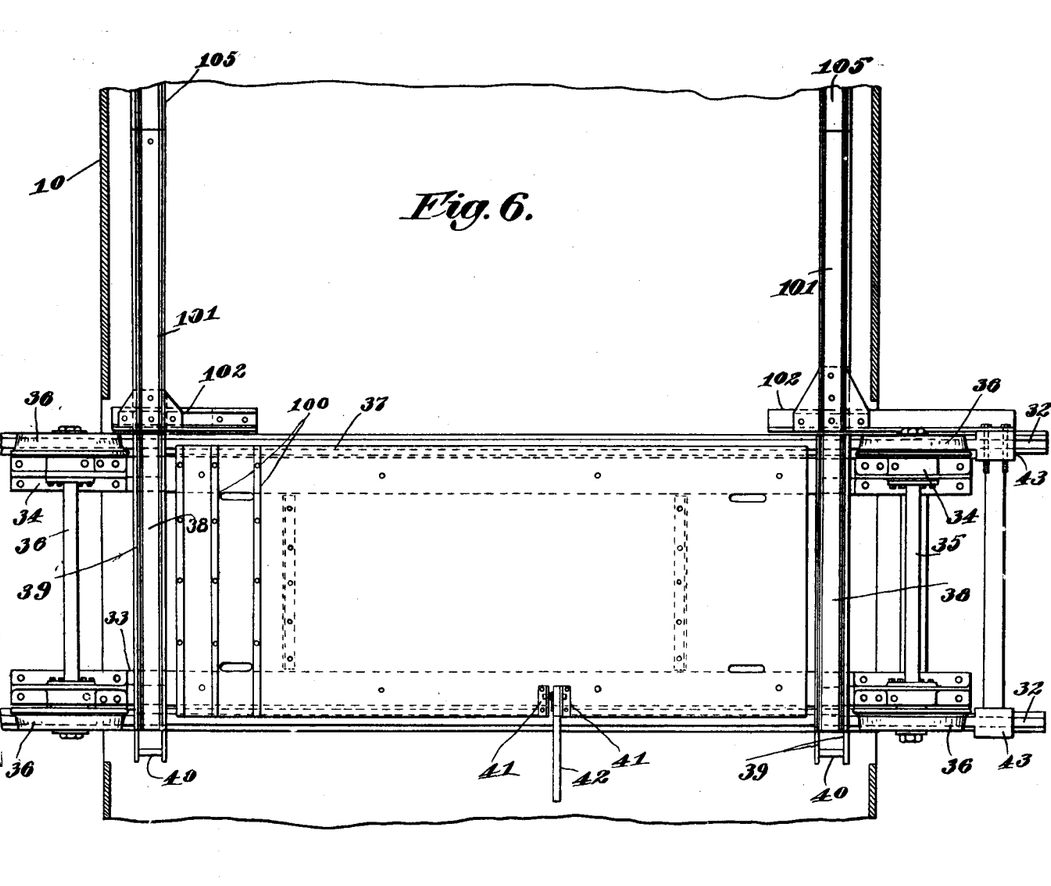
Fig. 6 is a plan view of the transfer car.

Numeral 33 designates a pair of side bars spaced apart from each other and having secured at each end bearing clamps 34. These bearing clamps are arranged in pairs, as shown, each pair being in alignment with the other, and in each pair is rotatably mounted an axle 35 to the ends of which are secured flanged wheels 36, the space between the flanged wheels being substantially equal to the distance between the rails 17 on the bridge 12. In the bearing clamps 34 are arranged anti-friction bearings, as ball bearings (not shown) for the axle 35. On the side bars 32 between the bearing clamps 34 is secured a bottom plate 37, it being possible to make this bottom plate 37 of different length, depending on the size of the brick unit to be handled by the car. Secured to the side bars 33 between each end of the bottom plate 37 and the adjacent bearing clamp 34 is secured a channel iron member 38, this member extending transversely of the side bars. Secured to each of the channel members 38, which constitute a cross track for the transfer car, and on each side thereof is a track reenforcing bar 39, and extending between said bars at one end thereof and at the end of the cross track for the transfer car is a car stop pin 40 with which may engage one of the wheels of the brick transfer car to limit the movement thereof on the cross tracks. Secured to the upper surface of the bottom plate 37 are a pair of spaced latch lever hinges 41 and in these hinges is pivotally mounted a spring pressed latch lever 42. Secured to the ends of the pair of tracks 32 that are adapted to be secured to the floor of the car 10, and on the ends of the tracks 17 adjacent to the platform 25, are car stop clamps 43 and which limit the movement of the transfer car to the right, for example, as shown in Fig. 6.

Figures 1, 10, 11:
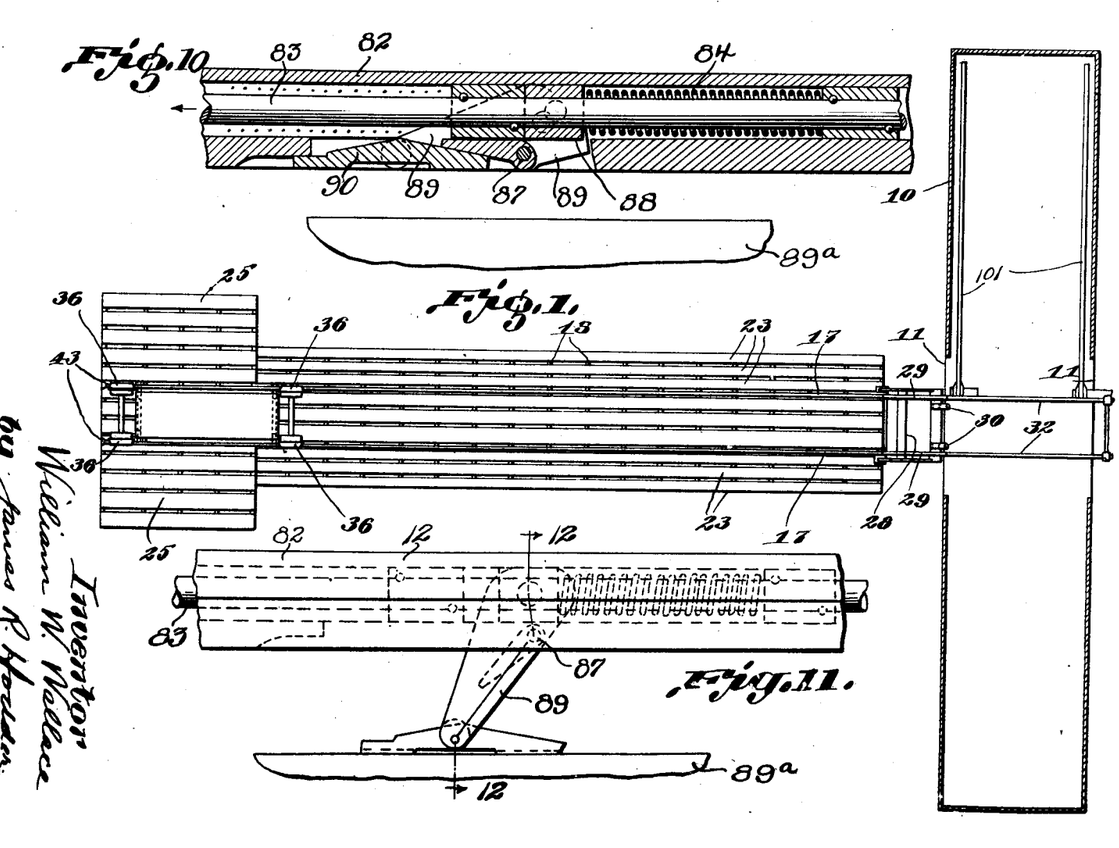
Fig. 1 is a plan view showing the machine in position relative to a box car.
Fig. 10 is a fragmentary sectional plan view of one of the parallelly arranged lifting fingers showing the mechanism encased therein.
Fig. 11 is a plan view similar to Fig. 10 but with the material engaging means in operated or extended position.
Figure 5:
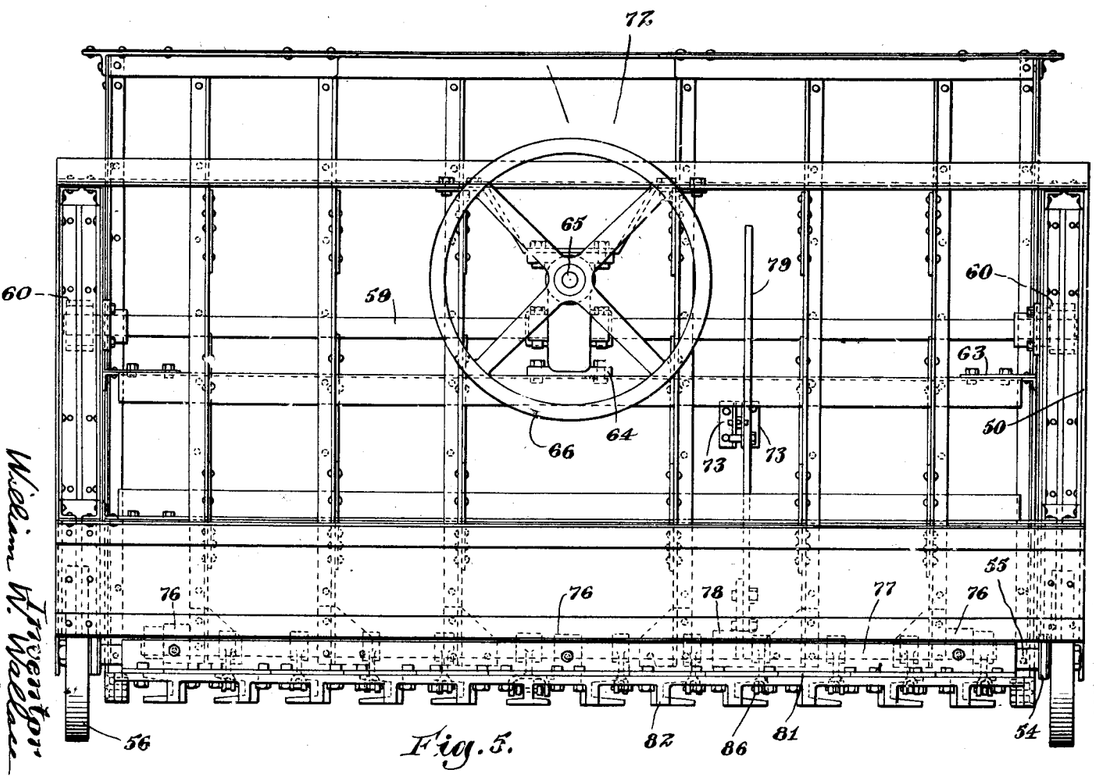
Fig. 5 is a rear elevation of the brick loading car.

Referring now to Figs. 5 and 10, numeral 50 designates the outside loading car frame, one being located on each side of the loading car, and spaced apart from each of the outside loading car frames and parallel thereto are inside truck frames 51. Secured to the lower front end of each of the outside car frames 50 and its adjacent and associated inside truck frame is a front axle 52, on each of which is rotatably mounted a front wheel 53 of suitable width and diameter. Secured to each of the inside truck frames 51 adjacent to its lower edge and at the rear thereof are bearings 54, these bearings being in alignment with each other, and rotatably mounted in said bearings is a shaft 55 extending transversely of the device. Secured to each end of the shaft 55 is a rear wheel 56, this being preferably of smaller diameter than the diameter of the front wheel 53, and it will be noted by reference to Fig. 10 that the outside truck frame 50 is cut away at 57 to allow for the rear wheel 56 to lie closely adjacent to the inside truck frame 51, or practically within the space between the inside truck frame and its adjacent outside truck frame. Secured to the inside truck frames 51 and in alignment with each other is a hoist segment shaft box 58 and in such shaft box is rotatably mounted the shaft 59. Secured to each end of the shaft 59 and in the space between the outside truck frames 50 and inside truck frames 51 is a pinion 60, each of which meshes with, and is adapted to drive, a hoisting segment 61. Each of the hoisting segments 61 is rotatably mounted on the shaft 62 extending between the outside truck frame 50 and the inside truck frame 51 adjacent to its upper front edge, as clearly shown in Fig. 10. Secured to the inside truck frame members 51 adjacent to the rear edge thereof is a transverse plate 63, and to the upper central face of such transverse member is secured an upwardly extending bearing member 64, this member also including a worm wheel housing that surrounds the shaft 59. Rotatably mounted in the bearing member 64 above the shaft 59 is a shaft 65. Secured to the rear end of the shaft is a hand wheel 66 provided with a handle 67 and by means of which the wheel 66, and therefore the shaft 65, may be rotated in either direction as desired. Secured to the shaft 65, or formed integral thereon, is a worm 65$^a$ which meshes with, and drives, a worm wheel 68 secured to the shaft 59 and within the bearing 64. It is obvious from the above that, rotation of the shaft 65 by means of the hand wheel 66 will cause a rotation of the shaft 59, and therefore a rotative movement of the pinions 60, and a corresponding rotative movement of the segments 61 about their axes 62. The truck frame as thus far described is adapted to be moved along the troughs 38 secured to the top of the transfer car heretofore described, it being, of course, essential that the trough 35 be of suitable width to receive the front and rear wheels 53 and 56 respectively of the loading car.

Located within the elements of the loading car structure, as above described, for vertical movement therein is a basket comprised essentially of side plates 69 spaced apart from each other in any suitable manner, and on the outside of each of the side plates 69 is secured, as by riveting, a hoist segment lug 70 having secured therein a shaft 71 having rotatably mounted thereon the forwardly extending portion of the hoist segment 61, as clearly shown in Fig. 10. As above noted, the side plates 69 are spaced apart and secured together in any suitable manner, such means including a back plate 72, and at the central portion of the back plate are secured lugs 73 spaced apart from each other. Pivotally mounted in said lugs is a rearwardly extending lever catch 74 provided with a tooth 75 for a purpose to be hereinafter described. Secured to the front face adjacent to the lower edge of the back plate 72 are bearing lugs 76, these lugs being in alignment with each other, and rotatably mounted therein is a splined shaft 77 extending transversely of the basket. Secured to the shaft 77 by a lug 78 is an upwardly and rearwardly extending clamping lever 79. Intermediate the ends of the clamping lever 79 and laterally extending outward therefrom is a pin 80 adapted to be moved into engagement with the tooth 75 on the lever catch 74. Secured to the lower edge of the back plate 72 is an angle 81 to which is secured the plurality of parallelly arranged forwardly extending fingers 82. The fingers 82 are spaced from each other a distance slightly greater than the thickness of a brick or slightly greater, therefore, than 2¼", the average thickness of the ordinary commercial brick 89ª. It is to be understood, however, that such distance is merely conventional as it may be varied to suit the size of brick being operated on. Slidably mounted in each of the parallelly arranged fingers 82 so as to be movable longitudinally of said fingers are shafts 83, a coil spring 84 on each of said shafts and properly associated with the mechanism providing for the return of said shaft to normal position. The rear end of each of the shafts 83 is provided with a clamping rod eye 85, such clamping rod eye being pivotally attached to the lower end of a brick clamp crank 86, these brick clamping cranks being secured to the splined shaft 77. In each of the parallelly arranged fingers and along the length thereof at one side are vertically arranged shafts 87, these shafts being spaced apart about the length of the ordinary brick 89ª and so arranged as to lie substantially opposite the middle of such commercial brick. Slidably mounted on the shaft 83 and abutting one end against the springs 84 is a swivel 88, and pivotally attached to the swivel is a finger clamp member 89 which is rotatably mounted on the shaft 87. Secured to the finger clamp member 89 is a finger clamp 90, the edge of which is relatively sharp so as to indent the side or face of the brick. When the clamp lever 79 is in the position shown in Fig. 10, the clamp members 90 are arranged parallel to one side of the fingers to which they may be attached, but when the clamp lever 79 is moved into the position where the laterally extending pin thereon is engaged by the tooth 75 on the latch lever 74, the shaft 77 is rotated to cause the finger clamp cranks 86 to move the shafts 83 rearwardly, thus rotating the clamp member 89 about the vertical shafts 87 and forcing the clamps 90 into engagement with the bricks and forcing such bricks firmly against the adjacent finger 82.

Figure 7:
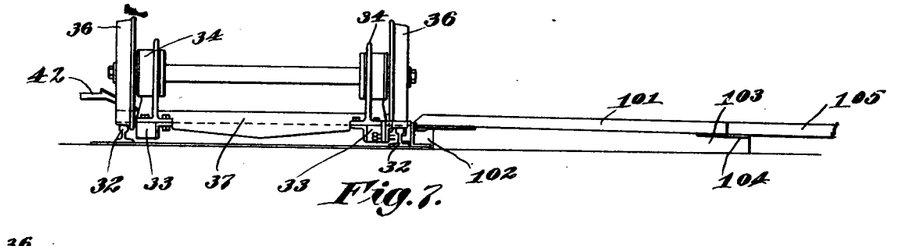
Fig. 7 is an end elevation of the transfer car.
Figure 8:
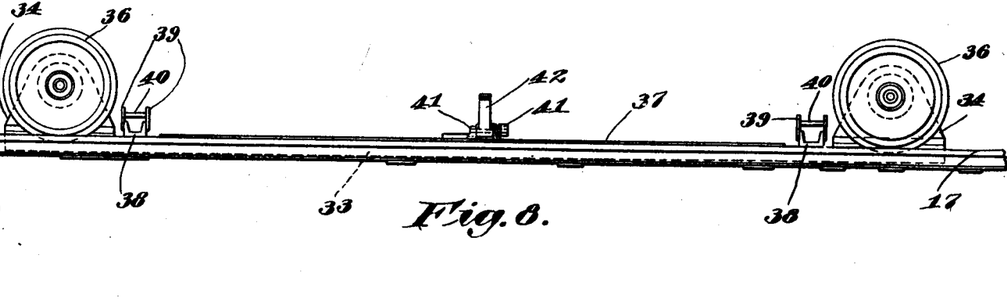
Fig. 8 is a side elevation on the transfer car.

The construction of the above is such that the top of the fingers are located about five inches from the top of the transfer car platform 37, this construction enabling the loading fork to be easily slid in and out of the space between the fingers even when such space is partially filled by a brick or bricks placed edgewise. I may secure to the upper surface of the platform 37 a plurality of parallelly arranged ribs 100, the distance between such ribs being substantially equal to the distance between the brick fingers. I have illustrated several of such members 100 in Fig. 6, and it is to be understood that I may continue this throughout the length of the platform 37. Referring to Fig. 6, 101 designates short lengths of trough of cross sectional area equal to the cross sectional area of the troughs 38, and these troughs are secured to members 102 adapted to be temporarily nailed, if necessary, to the floor of the box car 10, although, ordinarily, it will be found that the weight of such members 101 and 102 is sufficient to hold them firmly in position. Such members 101 are of any convenient length. The members 102 are of such height as to bring the rear end of the troughs 101 into substantial alignment with the troughs 38, as regards, when such troughs 38 on the transfer car are run on the tracks 32 extending transversely of the box car 10. On the outer end of each of the members 101 is arranged a member 103 which extends beyond the troughs 101, as indicated at 104, and on such portion 104 may rest the end of other troughs 105, as clearly shown in Figs. 6 and 7. The number of short lengths of troughs 101 and 105 may be as many as desired, depending to a great extent on the length of the box car or other enclosure which it is desired to load or unload.

It will be apparent, of course, that when brick are taken out of the kiln by means of a lifting and dumping fork, the finger courses are left behind and form the top course of the next succeeding load for the fork. In connection with the present invention, therefore, one of the problems to be solved is the means by which finger courses may be produced as, of course, such finger courses are necessary in order to allow the lifting and dumping fork to be withdrawn from under a unit stack of brick, and also to allow the lifting fingers of the brick loading car to be withdrawn from beneath a unit stack of brick. In my present invention, this operation may be performed in two separate ways. First, the required number of brick in each finger course, usually four, is placed by hand in the grooves defined by the ribs 100 on the platform 37 of the transfer car. When such grooves defined by the ribs 100 are employed and the finger courses placed in such grooves, the loading car lifting fingers are lowered down toward the platform 37 and it is, of course, to be understood that the ribs 100 come into registry with the lifting fingers of the loading car, and when the lifting fingers are lowered into position, the finger courses lie between the lifting fingers with the top surface thereof slightly below the top surface of the lifting fingers. The lifting and dumping fork carrying the unit load of brick, but without the finger courses, is now brought into position and the teeth of the fork may be slid into the space between one side of the lifting fingers of the loading car and one face of the bricks of the finger courses, as the width between fingers on the loading car is amply wide for this purpose. Second, the top surface of the platform 37 is left plain and the lifting fingers of the loading car are brought down to the proper position above the same and this position usually means that the top surface of the lifting fingers is five inches from the top surface of the platform 37. The lifting and dumping fork may now carry the unit load or brick, without the finger courses, and deposit them on the lifting fingers of the loading car, after which the loading and dumping fork may be withdrawn from beneath the unit load. Finger courses are now inserted between the lifting fingers, the space of five inches being ample to allow this to be done.

Regardless of which method is employed to construct the finger courses, the weight of the unit or load of brick is carried directly by the lifting fingers, and none of such load is supported by the finger courses. All that is necessary, therefore, is to have a sufficient gripping arrangement to grip the finger courses in position on the lifting fingers.

The operation of my improved device is as follows, it being assumed that the device has been constucted and arranged as above described and that it is desired to load a box car 10 by placing therein a plurality of unit stacks of bricks of any desired size and that said unit stacks of bricks are to be brought to the device by suitable lifting and dumping fork such, for example, as is described and claimed in my copending application, Ser. No. 85,908, filed Feb. 4, 1926.

Figures 2, 12:
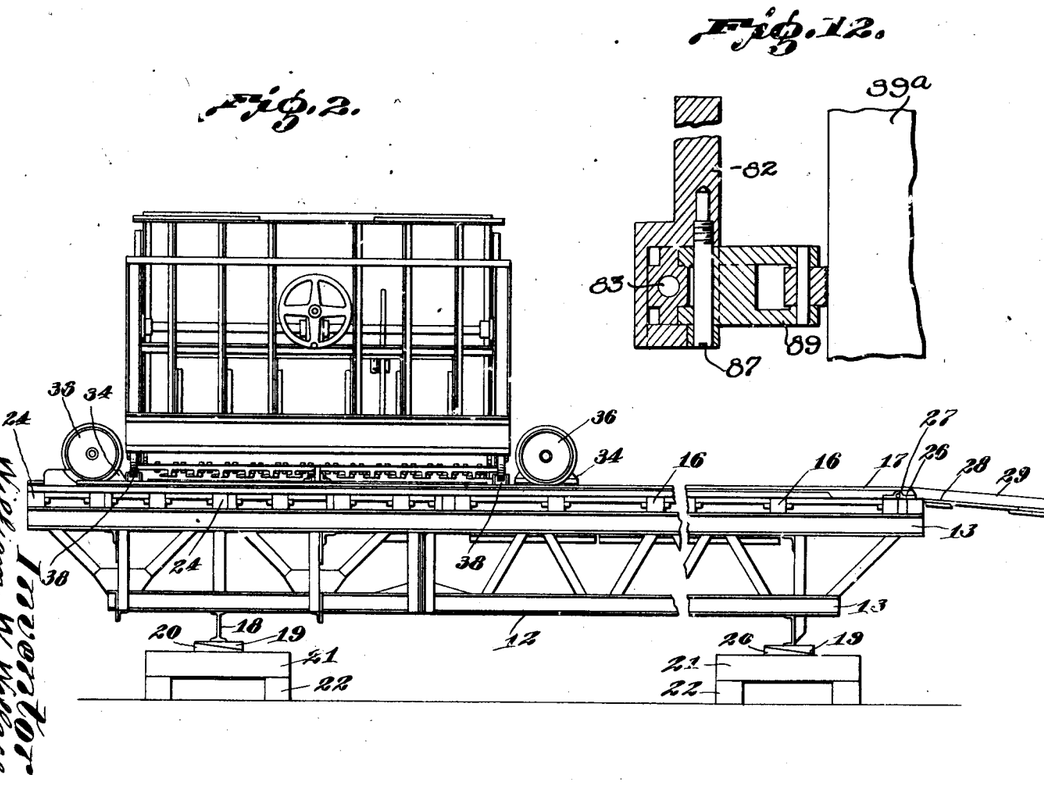
Fig. 2 is a side elevation of the car loading bridge.
Fig. 12 is a sectional elevation on the line 12—12 of Fig. 11.
Figure 3:
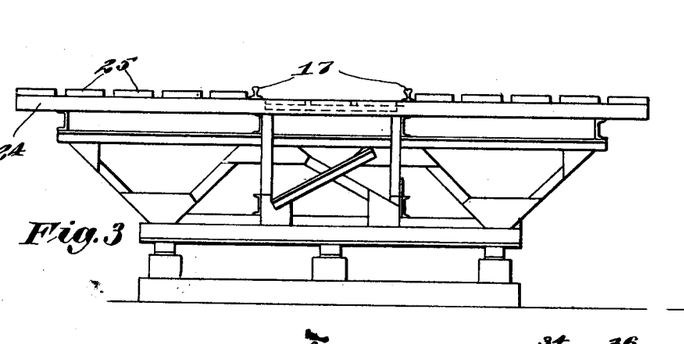
Fig. 3 is a rear end elevation of the car loading bridge.
Figure 4:
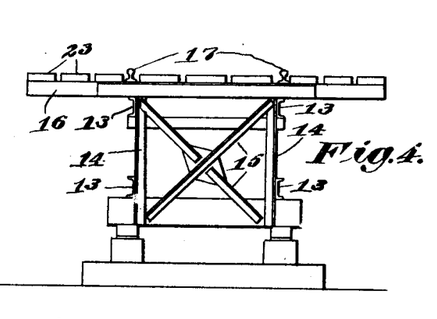
Fig. 4 is a front end elevation of the car loading bridge.
Figure 9:
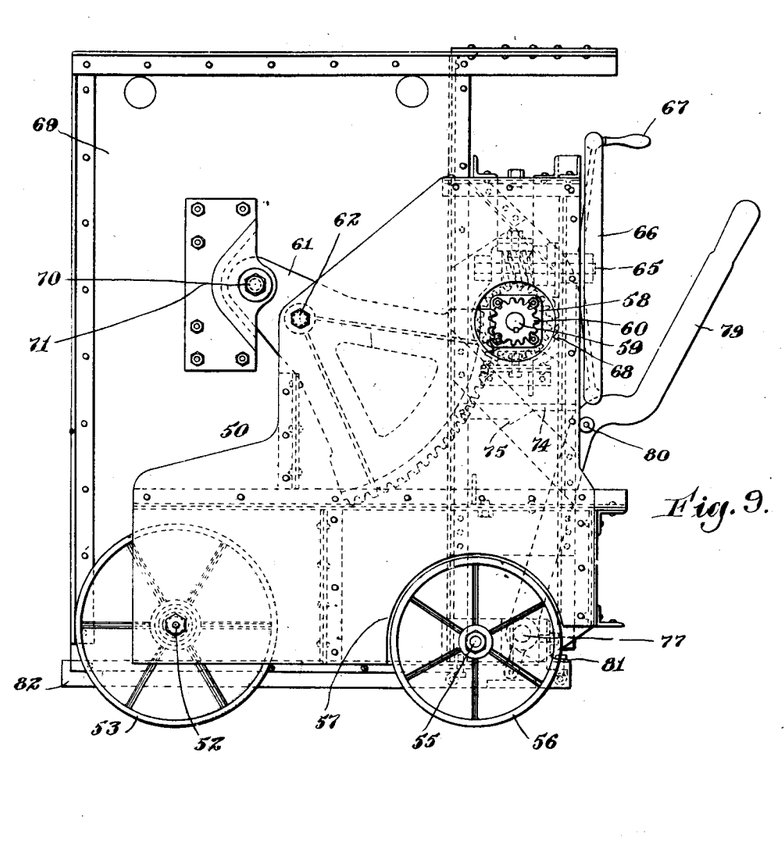
Fig. 9 is a side elevation of the brick loading car.
Figure 13:
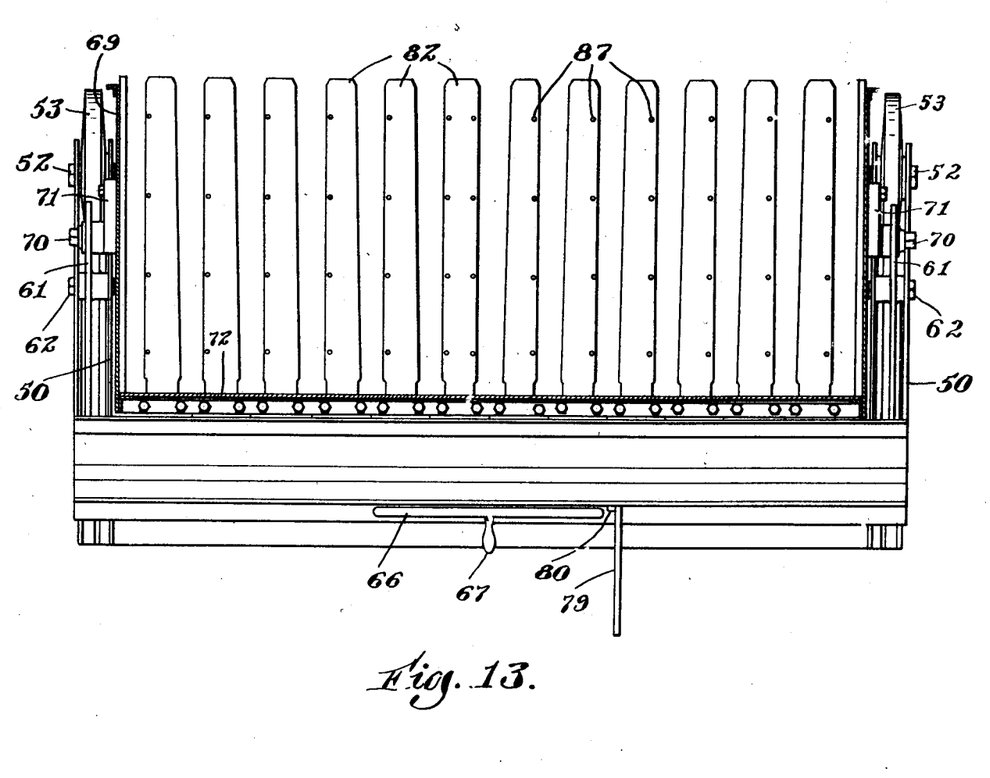
Fig. 13 is a plan view of the construction shown in Fig. 5.
Figure 14:
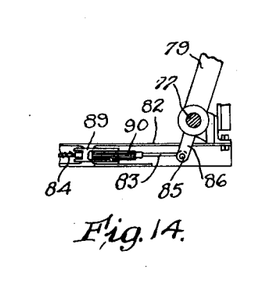
Fig. 14 is a detail on an enlarged scale of the construction shown in dotted lines in the lower right-hand corner of Fig. 9.

Assume that the transfer car is brought to the position shown in Figs. 1 and 2 with the loading car thereon, as indicated in Fig. 2, the basket of the loading car being in position relative to its carrying device, as indicated in Fig. 10, and in this position the upper part of the lifting fingers 82 are approximately 5 inches above the top surface of the platform 37 on the transfer car. If the parallelly arranged ribs 100 are employed, as shown in Fig. 6, then such ribs are so spaced as to be directly under the central portion of the lifting fingers 82. The operator may now slide in between the ribs 100 enough bricks 89$^a$, and on edge, to fill the width of the platform 37 or, if the ribs 100 are not employed, then such bricks 89$^a$ on edge, and which constitute the finger courses, are pushed between the fingers 82. As described, this operation of building the finger courses may be completed at this time or may be delayed until a later time, if desired. Assume, for the moment, that the finger courses have been built on the platform 37 and between the fingers 82, the lifting and dumping fork (not shown) is brought with its load of brick into position above the basket of the loading car and lowered until the fingers of the lifting fork are positioned between the fingers 82 or between the side of the fingers 82 and the adjacent side of one of the bricks 89$^a$ of the finger courses, the width of the space between the lifting fingers 82 being wide enough to allow for this to be done. As an alternative method of placing the unit stack of brick in position, the loading and dumping fork may be brought into such position that the fingers of such loading and dumping fork are moved inwardly from front to rear of the lifting fingers until the unit stack of brick is positioned properly above the lifting fingers, after which the lifting and dumping fork may be lowered to deposit the brick constituting the unit on top of the lifting fingers. The lifting and dumping fork may now be withdrawn from between the fingers 82 or from between the fingers and bricks constituting the finger course. It will be obvious that, because of the height of the top surface of the lifting fingers above the surface of the platform 37, is greater as compared with the height of a brick 89$^a$ placed on edge, the entire weight of the unit stack of brick will be carried by the lifting fingers and none of the weight of the unit stack rests on the finger courses. During the above steps in the operation, the clamp lever 79 is assumed to be in the position shown in Fig. 9. After the load of brick has been deposited on the lifting fingers 82, the upper end of the clamp lever 79 is moved forward, as viewed in Fig. 9, to bring the laterally extending pin 80 thereon into position to be engaged and locked by the tooth 75 on the lever 74, thus bringing the clamps 90 into position against one face of each of the bricks of the lower course of bricks and forcing said bricks individually against the opposite finger 82. The transfer car is now pushed along the rails 17, down the rails 29, and onto the rails 32 within the box car 10, the stops 43 at the end of the rails 32 preventing too far a movement of the transfer car, and the transfer car is thus brought to rest with the troughs 38 thereon in alignment with the troughs 101, 105, and as many others as have been necessary to extend the length of one half of the box car 10. The loading car is now pushed off the troughs 38 onto the troughs 101, 105, in succession and into the position relative to the tracks similar to 101 and 105 adjacent to the end of the box car 10 as such loading car occupied with respect to the troughs 100 during the loading process. When in this position, the hand wheel 66 is rotated to cause a rotation of the segment 61 so as to lower the basket into position to bring the finger course of bricks on the stack of bricks into engagement with the floor of such car. The lever 74 is operated to bring the tooth 75 thereon out of engagement with the laterally extending pin 80 on the clamping lever 79, which is brought back either manually or is brought automatically by means of the spring 84 into the position indicated in Fig. 10, thus withdrawing the clamps 90 from engagement with the faces of the bricks 89ª in the lower course and into position parallel to shafts 83. The loading car is now moved along the troughs 105 and 101 into the position on the troughs 38 on the transfer car and such transfer car with the loading car thereon is moved into the position indicated in Fig. 1, for example, where the above sequence of operations may again be initiated.

The above description explains the operation of loading one end of a box car. To load the opposite side of the box car, it is simply necessary to reverse the position of the loading car on the troughs 38. Provision is made for attaching the stop pin 40 and side plates 39 to the other end of the said troughs.

Having thus described my invention, what I claim as new is:

1. In an apparatus for loading brick into box cars, the combination of a track extending from a point without to the interior of the box car, but transversely thereof, temporary tracks extending lengthwise from the transverse tracks into the interior of the car, a transfer car movable on said transverse tracks, tracks mounted on the transfer car and extending transversely thereof, a loading car normally mounted on said transfer car and running on said transverse tracks, and a vertically movable basket carried by the loading car and means to deposit the same at any desired point within the box car.

2. In an improved loading car, the combination of a frame, wheel supports for said frame, a basket mounted for vertical movement within said frame, parallelly arranged fingers forming the bottom of said basket, and means on said fingers movable transversely thereof and adapted to clamp bricks between said clamps and the opposite finger.

3. An improved loading car for loading bricks into box cars and the like, comprising a wheeled frame, a basket, a shaft rotatably mounted on said wheeled frame and extending transversely thereof, a worm wheel mounted on said shaft, a rotatably mounted worm meshing with said worm wheel to rotate said shaft in either direction, fingers secured to the ends of said shaft, rotatably mounted segmental gears mounted at each end of the frame and meshing with said pinions, pivotal connection between the segmental gear and the basket whereby rotation of the first said shaft will cause a vertical movement of said basket.

4. In a loading car, the combination of a vertically movable basket, parallelly arranged fingers spaced apart from each other and forming the bottom of said basket, a plurality of parallelly arranged vertical shafts mounted in said fingers, clamps pivotally mounted on said vertical shafts, a longitudinally extending shaft in each of said fingers, connections extending between said pivotally mounted clamps and said longitudinally extending shafts, and means for simultaneously moving said shafts longitudinally and rotating said clamps on said vertical shafts.

In testimony whereof, I have signed my name to this specification.

WILLIAM W. WALLACE.